Patented May 23, 1933

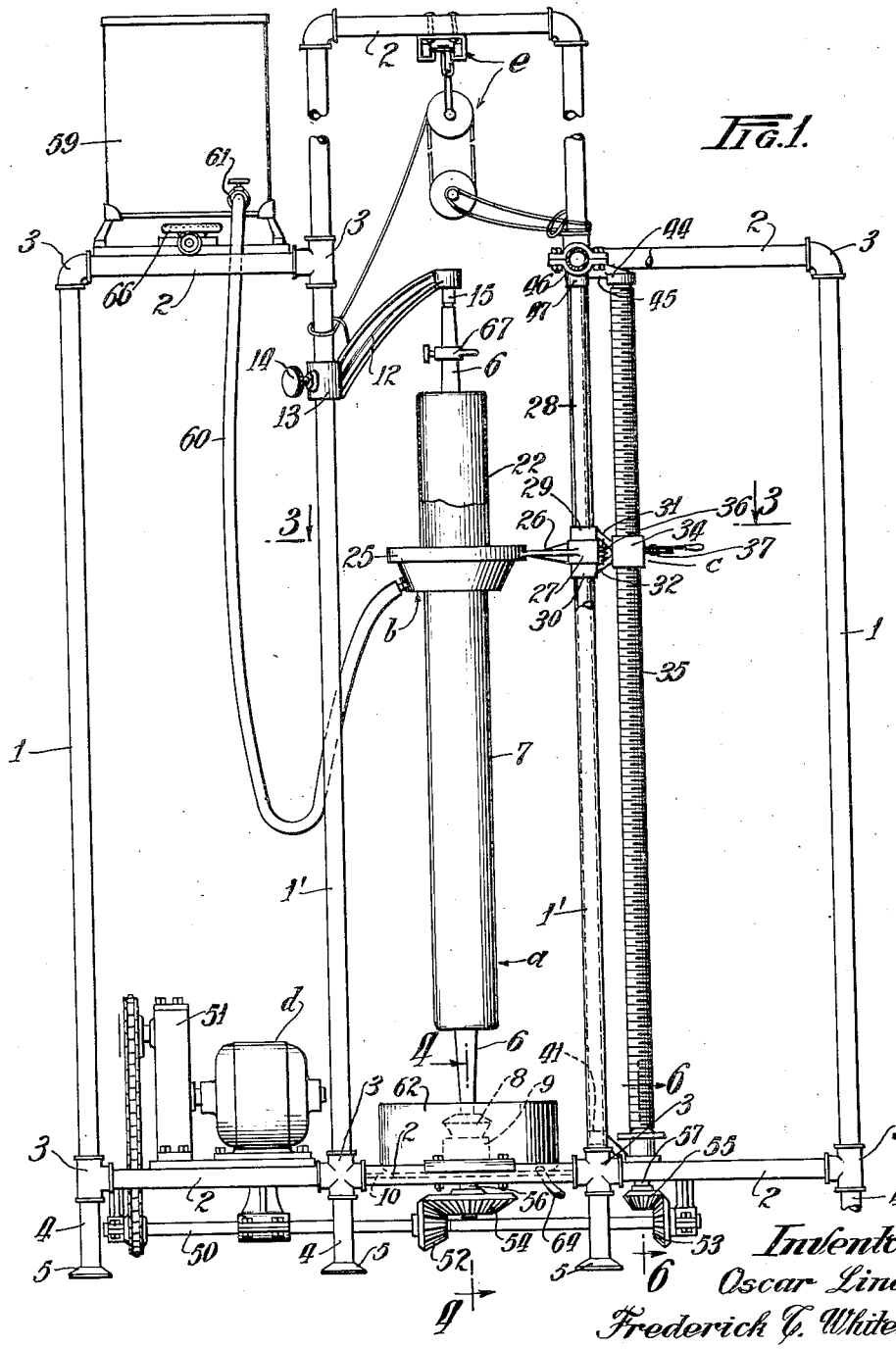

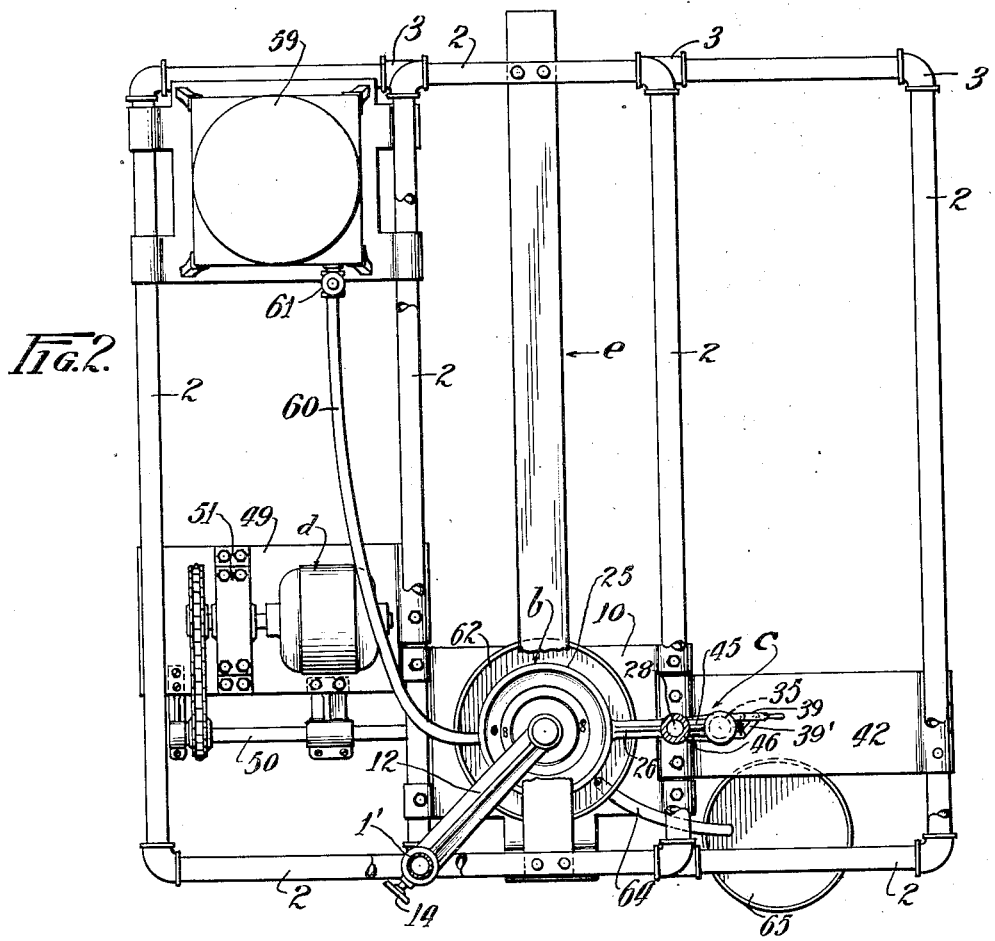
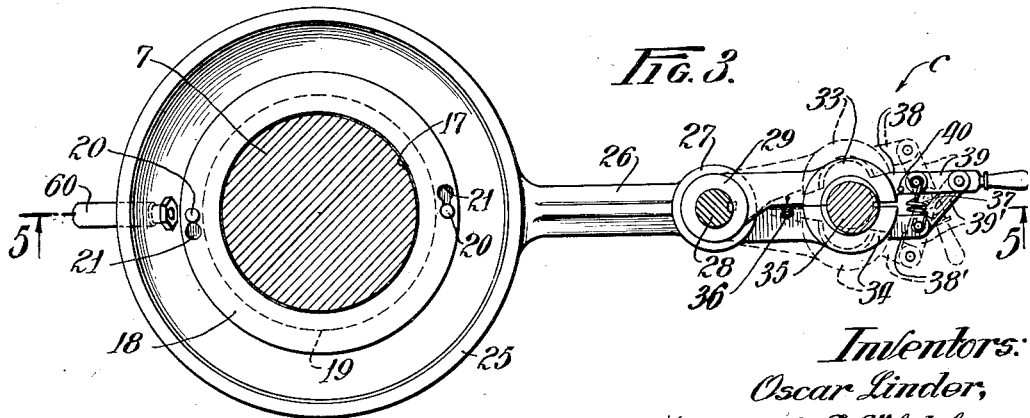

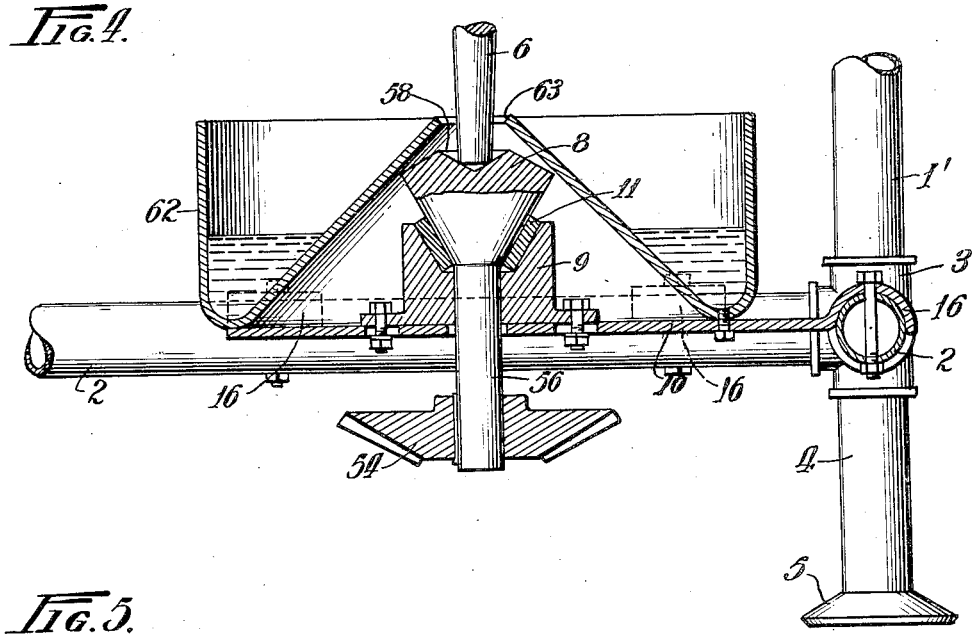
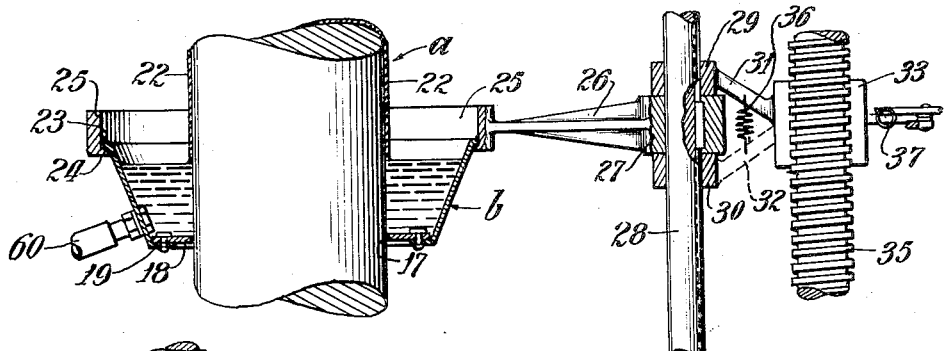
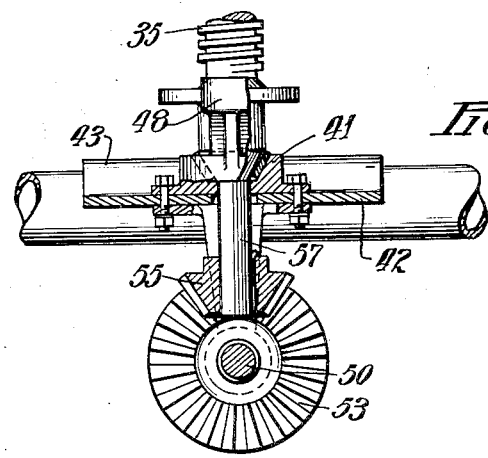

1,911,124

UNITED STATES PATENT OFFICE

OSCAR LINDER, OF CORAL GABLES, FLORIDA, AND FREDERICK T. WHITEHOUSE, OF OAK PARK, AND FRANK E. WILLSON, OF CHICAGO, ILLINOIS, ASSIGNORS TO SAM'L BINGHAM'S SON MFG. CO., OF CHICAGO, ILLINOIS, A CORPORATION OF ILLINOIS

MACHINE FOR COATING PRINTERS' ROLLERS

Application filed May 1, 1930. Serial No. 448,924.

This invention relates to machines for applying a final thin coating of roller composition to printers' rollers in accordance with the process, which, in part, forms the subject-matter of an application for U. S. Letters Patent heretofore, filed by the present applicants, Oscar Linder and Frank E. Willson, identified as application Serial No. 411,099, filed December 2, 1929.

To effect the objects thereof, a machine embodying our invention and improvements comprises the various features, combinations of features and details of construction hereinafter described and claimed.

In the accompanying drawings, in which the invention is fully illustrated,

Fig. 1 is a side elevation, partly broken away, of a machine embodying our invention and improvements taken from the lower side of Fig. 2.

Fig. 2 is a top plan view thereof, parts of the machine being broken away.

Fig. 3 is an enlarged fragmentary top plan sectional view on the line 3—3 of Fig. 1.

Fig. 4 is an enlarged fragmentary detail view on the line 4—4 of Fig. 1.

Fig. 5 is an enlarged fragmentary sectional view substantially on the line 5—5 of Fig. 3; and Fig. 6 is an enlarged fragmentary detail view substantially on the line 6—6 of Fig. 1.

Describing the invention with reference to the drawings, the operative parts of the machine are mounted upon a suitable frame which, as shown, is made of ordinary iron pipe, comprising upright members 1, 1' which are rigidly connected at or adjacent to their upper and lower ends by transverse members 2, said frame members being rigidly connected by usual pipe fittings 3. For reasons presently explained, the intermediate upright frame members, 1', extend a considerable distance above the outer frame members 1.

As shown, also, the machine frame is supported by means of legs 4 forming downward extensions of the upright frame members 1, 1' and connected thereto by couplings 3; flange fittings 5, forming feet, being preferably secured to the lower end of the legs 4.

In accordance with our invention, a roller to be coated, designated as a whole, $a$, and comprising a stock 6 and a body portion 7 applied thereon, is adapted to be mounted in substantially upright position in the machine frame by centering means adapted to engage opposite ends of the stock 6, which project at the ends of the body portion 7, the means for mounting said roller being preferably constructed and arranged to permit rotation of said roller.

As shown, the means for supporting and centering the lower end of the stock of the roller consists of a bearing member 8 rotatably mounted on a block 9 secured in fixed position to a plate 10 which, in turn, is supported upon transverse frame members 2 of the machine frame, said bearing being constructed and arranged to form a thrust bearing which, in operation, will sustain the weight of the roller $a$. As shown the bearing member 8 and the bearing therefore are tapered, the sides thereof converging downwardly at an angle of approximately 60 degrees. To reduce friction between the bearing member 8 and the block 9, said bearing preferably comprises a bushing 11 of bronze or other suitable material.

The centering device for supporting the upper end of the roller $a$ consists of an arm 12 having a boss 13 formed at one end provided with a bearing which is slidably fitted to one of the upright frame members 1' and which is adapted to be secured in different adjusted positions thereon by means of a set screw 14. As installed for use, the arm 12 diverges upwardly away from the frame member to which it is secured and in its outer end is a usual centering pin 15, the end of which is tapered at an angle of about 60 degrees and is adapted to engage a correspondingly tapered hole or opening formed in the upper end of the stock 6, in a familiar manner.

By making the arm 12 vertically adjustable, the said arm 12 may quickly and conveniently be raised or lowered to provide for mounting rollers of different lengths in the machine.

The plate 10 may be made of boiler plate or the like and, as shown, is secured in position on the transverse frame members 2 by means of hooked lugs 16 formed thereon, shaped and proportioned to fit over said supporting transverse frame members, and bolted or otherwise secured thereto.

For applying roller composition to the body portion of the roller $a$ in accordance with the process of said former application Serial No. 411,099, our improved machine comprises a receptacle designated as a whole $b$, adapted to contain roller composition and which may exemplify any desired form of receptacle suitable for the purpose, including those shown and described in said prior application.

Specifically and as shown, said receptacle, conveniently and preferably is made of suitable sheet metal in the form of a truncated cone and, in operation, is supported with its smaller end disposed downwardly, said receptacle being provided in its bottom with a hole or opening 17 adapted to fit a roller to be coated, with slight clearance.

To adapt the machine for coating rollers of different diameters, the bottom of the receptacle $b$ is formed by a separate plate 18, the edges of which rest upon and are detachably secured to an annular flange 19 formed at the lower edge of the side wall of said receptacle, thus providing for using different plates 18, having holes 17 of different sizes. Thus, by replacing a plate in the machine with another having a hole 17 of different size, the machine may readily be adapted for coating rollers of different diameter, in the manner desired.

As shown, the means for removably securing the bottom plates 18 in operative position in said receptacle, consists of headed studs 20 secured in the flange 19, which are adapted to engage key-hole slots 21 formed in said plates. The opening defined by the flange 19 is made sufficiently large to provide for coating rollers of any desired size which the machine is designed to receive.

In use, the receptacle $b$ contains roller composition in a melted condition, so that it will flow freely, and the coating 22 of material is applied to the roller by moving the receptacle $b$ containing roller composition in a melted condition downwardly along the roller $a$ from top to bottom thereof and, at the same time, preferably but not necessarily, rotating said roller.

In the preferable construction shown, the means for supporting said receptacle $b$ and for imparting movement thereto downwardly along the roller $a$ are as follows: The receptacle $b$ is provided at its upper edge with an outwardly projecting flange 23 which is adapted to rest in contact with a corresponding inwardly projecting flange 24 formed at the lower end of a ring 25, which is rigidly connected by an arm 26 with a boss 27 provided with a bearing splined to a rod 28 supported in fixed position in the machine frame in parallel relation to the axis of the centers 8 and 15 for supporting the roller $a$ in the machine.

As assembled for use, the boss 27 is embraced by hubs or bosses 29 and 30 which are connected, respectively, by arms 31 and 32 with opposite halves 33 and 34 of a split nut designated as a whole $c$, and which have threaded engagement with a screw 35 mounted to rotate in fixed bearings in the machine frame in parallel relation to the rod 28 and at the side thereof remote from a roller $a$ mounted in the machine. To provide for effecting engagement and disengagement of the nut $c$ with and from the screw 35, the nut sections 31 and 32 are flexibly connected and the hubs or bosses 29 and 30 fitted to the rod 28 so as to turn freely thereon.

As shown, the hubs or bosses 29 and 30 are flexibly connected by a coiled spring 36 opposite ends of which are attached to the arms 31 and 32, which connect said hubs or bosses with the nut sections. Said spring is installed under tension and will operate, in an obvious manner, to maintain the bosses 29 and 30 yieldingly in contact with opposite ends, respectively, of the boss 27.

As shown, also, the nut sections 33 and 34 are maintained yieldingly in engagement with the screw 35, in operation, by a coiled spring 37 opposite ends of which are attached to lugs 38, 38′ formed on said nut sections, respectively, at the sides thereof remote from the rod 28, and said nut sections are adapted to be turned pivotally to disengage them from said screw by manually operable means consisting, as shown, of a toggle lever comprising pivotally connected arms 39, 39′, the remote ends of which are pivoted to the lugs 38, 38′ on said nut sections. A pin 40 secured in one of said arms, limits pivotal movement of said toggle arms to a position slightly beyond their dead point, thus providing simple means for securing said toggle lever in position corresponding to open or disengaged position of the nut $c$ relative to the screw 35.

As shown, see particularly Fig. 6, the screw 35 is rotatably mounted in the following manner: The bearing for the lower end of said screw is formed in a bearing block 41 secured to the plate 42 secured in fixed position on transverse frame members 2 of the machine, said plate being substantially similar to the plate 10 and supported by hooked lugs 43 adapted to fit over transverse frame members, in like manner, as the supporting lugs for said plate 10. Also, as shown, the bearing for the lower end of said screw is a reproduction in detail, as near as may be of the bearing for the bearing member 8 for supporting the rollers to be coated and will be readily understood from the description thereof in connection with an examination of the drawings, without a separate description thereof in detail.

The bearing for the upper end of the screw 35 is formed in a boss 44 formed at the end of an arm 45 which projects laterally from a fitting 46 clamped or otherwise rigidly secured to a proximate frame member 2.

As shown, also, the upper end of the guide rod 28 for the receptacle *b* is formed in a boss 47 on the fitting 46, the lower end of said rod 28 being confined in a hole or opening in a boss 48 formed on the bearing block 41.

The rod 28 is pinned or otherwise held against turning movement, which would, of course, destroy the necessary relation of the receptacle *b* to a roller *a* to be coated.

In the preferable embodiment of our invention, rotation is adapted to be imparted to the screw 35 in operation, by suitable driving connection of said screw with a source of power, as shown, an electric motor mounted on the frame of the machine, indicated at *d*, rotation of said shaft by said motor operating to impart movement to the nut threaded thereto and associated parts, including the receptacle *b* for the coating material downwardly, a desirable relation for usual purposes being such that the movement imparted to said receptacle will be about 1 inch per second.

In like manner, our improved machine preferably comprises means for slowly rotating the roller *a* during the coating operation, a desirable rate of rotation for most purposes being approximately 25 R. P. M., though this relation, as also the movement of the receptacle *b* per minute, admits of a wide range of variation, to meet varying conditions.

As shown, the means for rotating the screw 35 and the roller *a* are as follows: Rotatably mounted in bearings secured to the undersides of and which depend from the plate 42 and a plate 49 supported on the machine frame, is a shaft 50 which is connected with the armature shaft of the motor by means of suitable driving connection, which, as shown, comprises a speed reducing gear, indicated at 51, and a sprocket drive connecting said speed reducing gear with the shaft 50.

Rotation is adapted to be imparted to the bearing member 8 and to the screw 35 by means of bevel gears 52 and 53 secured to the shaft 50, which intermesh with gears 54 and 55 secured to a downward extension 56 of the bearing member 8 and to a reduced downward projection 57 of the screw 35.

As shown, rotation is adapted to be imparted to a roller *a* mounted in the machine by frictional engagement of the lower end of the stock 6 of the roller with a tapered recess 58 formed in the upper end of the bearing member 8.

As shown, coating material in a melted or liquid condition is adapted to be supplied to the receptacle *b* from a kettle 59 mounted on the machine frame somewhat above the upper end of the longest roller on which the machine is designed to operate, and which is connected with said receptacle by means of a flexible tube 60 which communicates both with the kettle 59 and the receptacle *b* adjacent to their lower ends, said flexible tube 60 being connected to the kettle 59 by means of a valve-controlled nipple 61, whereby communication of the kettle 59 with the receptacle *b* may be regulated or entirely cut off, as may be desired.

Supported on the plate 10 below the roller *a* is a pan 62 which is adapted to catch any coating material which may drain from the roller *a* during the coating operation, or which may be discharged from the receptacle *b* when said receptacle passes below the lower end of the body portion 7 of the roller, thus clearing the hole in the lower end thereof and permitting any surplus coating material contained therein to be discharged therefrom.

As shown, the bottom of the pan 62 is substantially conical and is provided at its center or apex with a hole 63 to permit the passage therethrough of the lower end of the stock of the roller into engagement with the recess 58 in the upper end of the bearing member 8. As shown, the conical sides of the pan diverge outwardly and downwardly and merge into the side walls of said pan on an easy curve, forming what may be described as a circular trough-shaped receptacle.

The pan is preferably provided at the bottom of its trough-shaped interior with a discharge opening connected to which is a tube or pipe 64, which discharges into a loose pan, indicated at 65, thus providing for draining the coating material from the pan 62 and returning it to the kettle 59 to be used again.

The kettle 59 is equipped with a suitable burner 66 for heating the contents of the kettle.

For convenience in handling the rollers *a* in placing them into the machine in position to be coated and removing them therefrom, a trolley hoist, indicated at *e*, is preferably installed in combination with our improved machine. A number of hoists suitable for the purpose may be purchased commercially and it will not, therefore, be necessary either to show or describe the same in detail. For convenience in making hoisting connections thereto, a dog 67 may be removably secured to the projecting upper end of the stock 6 of the roller by means of a set screw, as shown, or other suitable means.

The portion of the trolley hoist which extends over the machine is supported on the frame of the machine, being secured directly to transverse frame members 2 secured to and which connect the upper ends of the intermediate frame members 1', this being the reason why said frame members are extended above other parts of the machine frame, as previously explained.

We claim:

1. In a machine for coating printers' rollers, the combination of means for supporting a roller with its axis disposed approximately vertical, a receptacle for containing roller composition provided with an opening to receive a roller to be coated, with only operating clearance, said receptacle being so proportioned that only a restricted portion, axially, of the surface of a roller to which said receptacle is adjusted will be exposed therein, and means for movably supporting said receptacle in operative relation to a roller to be coated and for imparting movement to and guiding said receptacle in a path substantially parallel with the axis defined by the roller supporting means, downwards along a roller to be coated.

2. A machine for coating printers' rollers as specified in claim 1, in which the roller supporting means comprises a rod, an arm provided at one end with a bearing slidably fitted to said rod, means for securing said arm in fixed position on said rod, and means at the outer end of said arm for engaging the upper end of the stock of a roller.

3. A machine for coating printers' rollers as specified in claim 1, the roller supporting means of which permits rotation of the roller, and which comprises means for rotating the roller to be coated in operation.

4. A machine for coating printers' rollers as specified in claim 1, in which the receptacle moving means comprises a rotatable screw, a nut which has threaded engagement with said screw, means connecting said nut and the receptacle for coating material for imparting movement to said receptacle with said nut, and means for rotating said screw.

5. A machine for coating printers' rollers as specified in claim 1, in which the receptacle supporting, moving and guiding means comprise a fixed guide rod, a rotatable screw, a nut which has threaded engagement with said screw, means connecting said nut and receptacle for imparting movement to said receptacle with said nut, comprising a boss splined to said guide rod for guiding said receptacle, and means for rotating said screw.

6. A machine for coating printers' rollers as specified in claim 1, in which the receptacle moving means comprises a rotatable screw, a nut which has threaded engagement with said screw, means connecting said nut and the receptacle for coating material for imparting movement to said receptacle with said nut, means for rotating said screw, and means for disengaging said nut from said screw to permit movement of the receptacle independently thereof.

7. A machine for coating printers' rollers as specified in claim 1, in which the receptacle moving means comprises a fixed guide rod, a supporting member for the receptacle for containing coating material comprising a boss splined to said rod, a rotatable screw, a split nut the sections of which are movably supported and are arranged for engagement with and disengagement from said screw, arms on the sections of said nut, bosses thereon provided with bearings fitted to turn on the guide rod for said receptacle at opposite ends, respectively, of the receptacle supporting boss splined to said guide rod, and means for rotating said screw.

8. Apparatus for coating printers' rollers, comprising means for mounting a roller, a receptacle which encloses a portion only of the surface of the roller to be coated, axially thereof, and means for imparting movement to said receptacle downwardly along a roller mounted in said apparatus, said receptacle comprising a separate detachable bottom provided with an opening proportioned to receive a roller to be coated.

9. A machine for coating printers' rollers as specified in claim 1, in which the receptacle moving means comprises a rotatable screw, a nut which has threaded engagement with said screw, means connecting said nut and the receptacle for coating material for imparting movement to said receptacle with said nut, means for rotating said screw and means for bringing said nut to rest when it attains a predetermined position in its downward movement.

In witness that we claim the foregoing as our invention, we affix our signatures this 25th day of April, 1930.

OSCAR LINDER.
FREDERICK T. WHITEHOUSE.
FRANK E. WILLSON.